United States Patent
Furuya

(12) 
(10) Patent No.: US 6,297,873 B1
(45) Date of Patent: Oct. 2, 2001

(54) IMAGE RECORDING APPARATUS FOR RECORDING AN IMAGE ACCORDING TO CHARACTERISTICS OF THE IMAGE RECORDING MEDIUM

(75) Inventor: Hiroyuki Furuya, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/326,701

(22) Filed: Jun. 7, 1999

(30) Foreign Application Priority Data

Jun. 8, 1998 (JP) .................................................. 10-159187
Feb. 23, 1999 (JP) .................................................. 11-044315

(51) Int. Cl.[7] .......................... G03B 27/52; G03B 27/32; H04N 1/46; H04N 1/00
(52) U.S. Cl. .............................. 355/40; 355/27; 358/504; 358/406
(58) Field of Search ................................. 355/40, 41, 27, 355/38; 358/519, 522, 521, 504, 406, 523, 474, 527; 347/19

(56) References Cited

U.S. PATENT DOCUMENTS

| | | | |
|---|---|---|---|
| 5,579,132 | * 11/1996 | Takahashi et al. | 358/527 |
| 5,828,461 | * 10/1998 | Kubo et al. | 355/38 |
| 5,969,796 | * 10/1999 | Mogi | 355/27 |
| 6,081,343 | * 6/2000 | Terashita | 358/523 |
| 6,183,933 | * 2/2001 | Ishikawa et al. | 358/474 |

* cited by examiner

Primary Examiner—Russell Adams
Assistant Examiner—Peter B Kim
(74) Attorney, Agent, or Firm—Sughrue, Mion, Zinn, Macpeak & Seas, PLLC

(57) ABSTRACT

An image input/output characteristic is computed from environmental information obtained by a temperature sensor, a photographic printing paper type read by an identification sensor, photographic printing paper characteristic information stored in a photographic printing paper characteristic memory, and previous calibration history information stored in a calibration history memory. Results of computation are output to a laser driver, and an amount of exposure or the like is corrected so as to calibrate a printer. As a result, a number of times that a calibration test pattern is printed and density is measured can be reduced, thereby improving working efficiency and saving photosensitive materials.

19 Claims, 8 Drawing Sheets

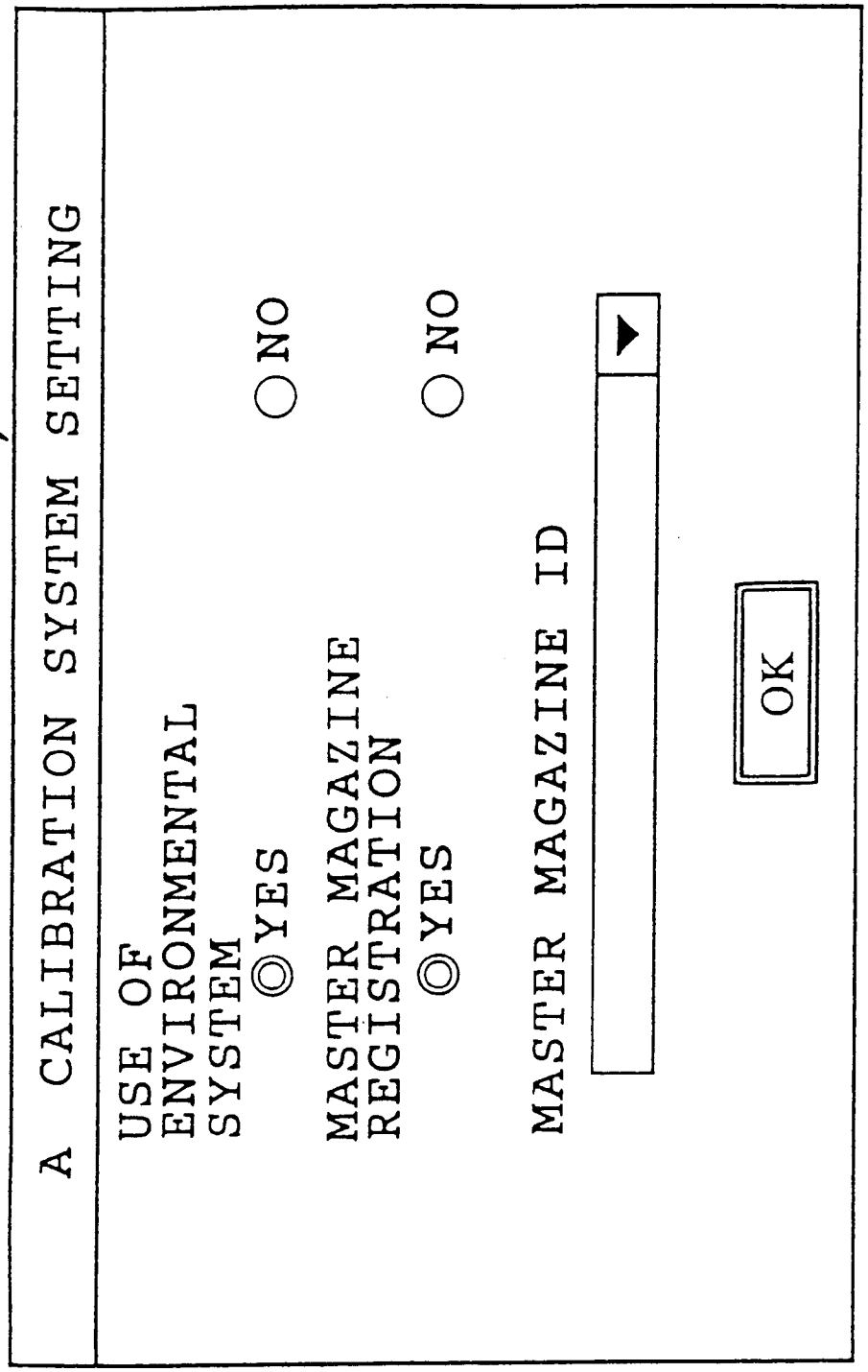

CALIBRATION RESULTS

AMOUNT OF CORRECTION FROM STANDARD IS LARGE. DENSITY MEASUREMENT CALIBRATION OF SET MAGAZINE IS RECOMMENDED.

OK

CALIBRATION RESULTS

THIS MAGAZINE HAS NOT BEEN CALIBRATED FOR A LONG TIME. DENSITY MEASUREMENT CALIBRATION OF SET MAGAZINE IS RECOMMENDED.

OK

IMAGE RECORDING APPARATUS FOR RECORDING AN IMAGE ACCORDING TO CHARACTERISTICS OF THE IMAGE RECORDING MEDIUM

BACKGROUND OF THE INVENTION

1. Field of the Invention

The present invention relates to an image recording apparatus which, when an image recorded on a photograph film or the like is printed onto a photosensitive material by exposure, carries out calibration by correcting an exposure rate, color gradation of the like so as to obtain an appropriate finished print image.

2. Description of the Related Art

In a photograph printing apparatus for printing an image of a photograph film onto a photosensitive material, there are cases in which an appropriate print image cannot be obtained because the printing color development characteristic changes depending on the kind of photosensitive material and due to environmental changes such as changes in temperature, humidity and the like at the printing time, deterioration of the development liquid, and the like. In such cases, a test pattern for printer calibration is printed and the density of this test pattern is measured. According to the results, the printer is calibrated by correcting the exposure amount, color gradation, or the like so that the resulting image is appropriate, and then, printing is started.

However, if the print color development characteristic changes due to use of a different type of photosensitive material or environmental changes such as changes in temperature, humidity and the like at the printing time and thus an appropriate image cannot be obtained, a test pattern for calibration is printed each time when such a case arises, and then the printer is calibrated by measuring the density or the like. Therefore, a problem arises in that efficiency of this calibration work is poor and photosensitive materials for the calibration test patterns are wasted.

SUMMARY OF THE INVENTION

Accordingly, an object of the present invention is to provide an image recording apparatus in which printer calibration is carried out, without printing a calibration test pattern to measure a print density, by calibration by computing an image input/output characteristic, in accordance with previous calibration history information or environmental information including temperature changes or the like, thereby improving working efficiency and eliminating waste of photosensitive materials.

To achieve the above object, according to a first aspect of the invention, there is provided an image recording apparatus for recording an image on a photosensitive material wherein a calibration test pattern is outputted on the basis of calibration test pattern data, the output calibration test pattern is read, an image input/output characteristic is computed on the bases of the read pattern data, and calibration is carried out, the image recording apparatus comprising: photosensitive material characteristic storage means for storing a characteristic of a photosensitive material; environmental information obtaining means for obtaining environmental information which affects changes in the characteristic of the photosensitive material; photosensitive material characteristic reading means for reading the characteristic of the photosensitive material from the photosensitive material characteristic storage means; and estimated calibration means for computing an image input/output characteristic for calibration from the characteristic read by the photosensitive material characteristic reading means, previous calibration information including the image input/output characteristic computed at a previous calibration time, and the environmental information at a current calibration time.

According to the first aspect of the invention, photosensitive material characteristic information such as the $\gamma$ characteristic, base material, surface type and the like of types of photosensitive materials are stored by the photosensitive material characteristic storage means. The photosensitive material characteristics stored in the photosensitive material storage means are read out by the photosensitive material characteristic reading means. Further, environmental information is obtained by the environmental information obtaining means. The environmental information may be any information of environmental conditions which indicates environmental conditions (temperature, humidity or the like) affecting change in the photosensitive characteristic.

Then, by the estimated calibration means computing an image input/output characteristic for calibration from the previous calibration information, the photosensitive material characteristic information and the environmental information, calibration can be carried out. That is, the previous calibration information may include the image input/output characteristic computed when previous calibration is carried out, the previous environmental information used for the previous calibration, and the photosensitive material characteristic information (which may be only type of the photosensitive material).

The image input/output characteristic may be anything which decides exposure conditions when calibration is carries out, such as an look up table (a correction table), a parameter for obtaining the look up table, an amount of exposure obtained by computation, a parameter for representing an amount of change or an amount of correction from a predetermined value, or the like.

As a result, if the photosensitive material type is changed, from the photosensitive material characteristic information stored by the photosensitive material characteristic storage means, by the photosensitive material characteristic reading means characteristic information for the corresponding photosensitive material type is obtained, and then a correction value for calibration is computed so as to carry out the calibration. If an environmental condition such as temperature changes, environmental information such as the temperature at the time of printing is obtained by the environmental information obtaining means. A correction value for calibration is computed, and calibration is carried out. Therefore, the work of printing a calibration test pattern and measuring the density thereof or the like is no longer needed, and work efficiency can be improved. At the same time, waste of photosensitive material can be eliminated.

According to a second aspect of the invention, there is provided an image recording apparatus wherein said estimated calibration means carries out calibration using actual calibration information based on the read pattern data as previous calibration information.

According to a second aspect of the invention, the estimated calibration means does not carry out calibration using calibration information for calibration by the estimated calibration means (hereinafter, "estimated calibration") which may include estimated error as previous calibration information. The estimated calibration means carries out calibration by outputting a test pattern for calibration and using calibration information for actual calibration based on the read pattern data as previous calibration information. Therefore, more accurate estimated calibration can be carried out.

According to a third aspect of the invention, there is provided an image recording apparatus wherein an actual calibration information based on the read pattern data is an actual calibration information based on the last read pattern data.

According to a third aspect of the invention, calibration information by the last actual calibration among previous actual calibration is used for estimated calibration by the estimated calibration means Therefore, further more accurate estimated calibration can be carried out.

According to a fourth aspect of the invention, there is provided an image recording apparatus according to the first aspect further comprising an identification means for identifying the type of the photosensitive material, wherein the characteristic of the photosensitive material is read from the photosensitive material characteristic storage means on the basis of the type of the photosensitive material identified by the identification means.

According to the fourth aspect of the invention, the photosensitive material type can be identified by the identification means which identifies photosensitive material types. Thus, the work for identifying the photosensitive material type can be eliminated, thereby improving the work efficiency.

According to a fifth aspect of the invention, there is provided an image recording apparatus according to the first aspect further comprising a calibration history storing means for storing actual calibration information which is based on the read pattern data, and calibration information by said estimated calibration means.

According to the fifth aspect of the invention, the calibration history storing means stores calibration information (environmental information at the time of an actual previous calibration, the photosensitive material type at the time of an actual previous calibration, and results of computation of the actual calibration (the image input/output characteristic)), and calibration information of computation by the estimated calibration means (environmental information at the time of an previous estimated calibration, the photosensitive material type at the time of an previous estimated calibration, and results of computation of the estimated calibration (the image input/output characteristic)) used for calibration by measuring the density of an output test pattern. Then, an image input/output characteristic for calibration is computed on the basis of the calibration history information stored by the calibration history storing means, the current environmental information and the photosensitive material type, so as to carry out the calibration (the estimated calibration). As a result, the work of printing the calibration test pattern and measuring the density or the like can be omitted, thereby improving the work efficiency and saving photosensitive materials.

According to a sixth aspect of the invention, there is provided an image recording apparatus wherein said calibration history storing means stores at least two pieces of the calibration information as reference information, and said estimated calibration means carries out calibration based on an amount of change obtained from the stored reference information.

According to the sixth aspect of the invention, at least two pieces of calibration information are stored as reference information. An image input/output characteristic for a current calibration is computed from an amount of change obtained by this stored reference information, previous calibration history information, current environmental information, and the photosensitive material characteristic. As a result, a change, which cannot be corrected only by a correction value of changing the photosensitive material characteristic by changing the environment such as the temperature or the like, can be calibrated (i.e., estimated calibration can be achieved) Further, the work of printing the calibration test pattern and measuring the test pattern density can be eliminated, thereby improving the work efficiency and saving photosensitive materials.

According to a seventh aspect of the invention, there is provided an image recording apparatus wherein the reference information recorded in the calibration history storing means is subjected to actual calibration based on the read pattern data.

According to the seventh aspect of the invention, a test pattern is printed and previous calibration history information calibrated (i.e., the actual calibration is performed) by density measurement or the like is stored as the reference information. An image input/output characteristic for calibration is computed on the basis of this reference information, previous calibration history information, current environmental information and the photosensitive material characteristic. Calibration (estimated calibration) is carried out without printing a calibration test pattern and measuring the density thereof or the like.

In other words, it is possible to calibrate (perform the estimated calibration) a change which cannot be corrected only by a correction value of changing the photosensitive material characteristic by changing the environment such as the temperature or the like. The work of printing a calibration test pattern and measuring the density or the like can be omitted, thereby making it possible to improve the work efficiency and save photosensitive materials.

According to a eighth aspect of the present invention, there is provided an image recording apparatus wherein said estimated calibration means carries out calibration based on an amount of change obtained from the reference information in consideration of an amount of change in characteristic of the photosensitive material due to environmental variation.

According to a eighth aspect of the present invention, an amount of change obtained from the reference information includes an amount of change in characteristic of the photosensitive material due to environmental variation. The estimated calibration means carries out estimated calibration an amount of change in characteristic of the photosensitive material due to environmental variation. For example, from the environmental information including the reference information, environmental variation between the reference information is obtained, and from the amount of change obtained from the reference information, the amount of change due to environmental variation is subtracted. Therefore, the amount of change of the image input/output characteristic due to a factor except for environmental variation (such as deterioration of developer) can be calibrated.

According to a ninth aspect of the invention, there is provided an image recording apparatus wherein at the time of calibration by the estimated calibration means, if a correction value is a predetermined value or more, calibration is carried out without using the reference information or by restricting the correction value.

According to the ninth aspect, if the correction value for calibration computed from the stored reference information, current environmental information and the photosensitive material characteristic is a predetermined value or more, calibration (estimated calibration) is carried out without using that stored reference information, and is instead based on previous calibration history, the photosensitive material characteristic and the environmental information. Alternatively, calibration may be carried out by restricting in some way the correction value for calibration which is computed from the stored reference information, the current environmental information and the photosensitive material characteristic. For example, the correction value for calibration may be multiplied by a coefficient, or may be replaced by a maximum correctable value, or the like. In this way, an even more appropriate print image may be obtained.

According to a tenth aspect of the invention, there is provided an image recording apparatus wherein when a predetermined period of time has passed since the reference information was obtained, at the time of calibration by said estimated calibration means, the calibration computation is carried out without using the reference information.

According to the tenth aspect of the invention, if a predetermined period of time has passed since the previous calibration history was stored as the reference information, an image input/output characteristic for calibration is computed on the basis of the previous calibration history, the photosensitive material characteristic and the environmental information, without using the stored reference information. Then, calibration (estimated calibration) is carried out. As a result, an even more appropriate print image can be obtained.

According to an eleventh aspect of the present invention, there is provided an image recording apparatus wherein a plurality of the previous calibration history information including a calibration caused by a periodic change are stored as the reference information, and the calibration is carried out by the estimated calibration means by selecting any of the stored plurality of the reference information.

According to the eleventh aspect of the invention, several pieces of previous calibration history information calibrated in accordance with periodic changes in the environmental information, such as the four seasons, are stored as reference information. By selecting therefrom a previous calibration history information which is optimum reference information, an appropriate print image can be obtained.

According to a twelfth aspect of the present invention, there is provided an image recording apparatus comprising a first notification means for giving notice that a correction value is a predetermined value or more at the time of calibration by the estimated calibration means.

According to the twelfth aspect of the invention, if the image input/output characteristic for calibration computed from the stored reference information, the current environmental information and the photosensitive material characteristic is a predetermined value or more, the first notification means gives notice that such a state exists. That is, the user can be notified that a change in the image input/output characteristic is large and the reliability of the image input/output characteristic computed by a estimated calibration means (i.e., the reliability of the estimated calibration) is low. Provided that the first notification means can notify the user, the first notification means may give notice by any method, such as sounding an alarm, displaying that there is an error, or the like.

According to a thirteenth aspect of the present invention, there is provided an image recording apparatus wherein the first notification means urges that actual calibration be carried out by outputting read pattern data.

According to the thirteenth aspect of the invention, if the image input/output characteristic for calibration computed from the stored reference information, the current environmental information and the photosensitive material characteristic is greater than or equal to a predetermined value, the first notification means urges that calibration be carried out by outputting calibration test pattern data, thereby preventing calibration (estimated calibration) of low reliability from being carried out.

According to an fourteenth aspect of the present invention, there is provided an image recording apparatus comprising a second notification means for giving notice that a predetermined time or more has passed since the reference information was obtained.

According to the fourteenth aspect of the invention, if a predetermined time or more has passed since the previous calibration history was stored as the reference information, the second notification means gives notice that such a state exists. That is, the user can be notified that the reference information to be used for computation of the image input/output characteristic by a estimated calibration means is old and the reliability of the image input/output characteristic to be computed (i.e., the reliability of estimated calibration) is low. Provided that the second notification means can notify the user, the second notification means may give notice by any method, such as sounding an alarm, displaying that there is an error, or the like.

According to a fifteenth aspect of the present invention, there is provided an image recording apparatus wherein the second notification means urges that calibration be carried out by outputting calibration test pattern data.

According to the fifteenth aspect of the invention, if a predetermined time or more has passed since the previous calibration history was stored as the reference information, the second notification means urges that calibration be carried out by outputting calibration test pattern data. As a result, it is possible to prevent calibration (estimated calibration) by a correction value of low reliability from being carried out.

According to a sixteenth aspect of the invention, there is provided an image recording apparatus further comprising: comparison means for comparing environmental information included the last calibration information stored in said calibration history storing means when the last calibration is carried out and environmental information when the current calibration is carried out; decision means for deciding whether calibration is carried out by said estimated calibration means based on the results of said comparison means.

According to a sixteenth aspect of the invention, comparison means compares environmental information included the last calibration information (among information of actual calibration and estimated calibration), i.e., information of the last calibration carried out, and environmental information of the current calibration. For example, when the implementation of calibration is managed on each magazine accommodating the photosensitive material, the calibration information when the calibration is carries out where the results are reflected on each current magazine is the last calibration information of the magazine.

The decision means for deciding whether estimated calibration is carried out based on the results of this comparing. The estimated calibration means carries out estimated calibration only when whether estimated calibration is carried out is decided by the decision means, When the difference between environmental information of previous calibration and environmental information of the current calibration is in a predetermined range, the estimated calibration means does not carry out estimated calibration.

For example, when the temperature is environmental information, if estimated calibration is carried out in accordance with small change in temperature, the recording density changes in a small scale when an image is recorded on the photosensitive material. With the decision means, the change in temperature is ignored which is in the predetermined difference of temperature, and estimated calibration is carried out when the change in temperature is the predetermined difference of temperature or more. Therefore. the recording density is prevented from changing in a small scale, and the image recording apparatus can always perform stable and high quality image recording process.

According to a seventeenth aspect of the invention, wherein said decision means decides using a decision threshold value different from each type of the photosensitive material.

According to a seventeenth aspect of the invention, the decision means makes decision where the decision threshold value which is the reference of decision whether estimated calibration is carries out is changed in accordance with the type of the photosensitive material. Generally, the change in the characteristic of photosensitive material caused by the environmental variation is different from each type of the photosensitive material. Therefore, if the type of the photosensitive material is changed, the decision is always appropriate.

According to a eighteenth aspect of the invention, wherein said estimated calibration means carries out calibration at a predetermined carrying out time.

According to a eighteenth aspect of the invention, the estimated calibration means carries out calibration at a predetermined carrying out time, for example, at a time the magazine is set, every time an image is recorded, every time a predetermined image is recorded, every time a predetermined time has passed, and at the opening hour. Therefore, the image recording apparatus can always perform stable and high quality image recording process.

According to a nineteenth aspect of the present invention, there is provided an image recording apparatus wherein the environmental information is at least information including temperature.

According to a nineteenth aspect of the present invention, for example, when the contribution of other environmental information (such as humidity) to change in the photosensitive material is smaller than that of temperature, temperature is used as environmental information and estimated calibration can be carried out.

BRIEF DESCRIPTION OF THE DRAWINGS

FIG. 7 shows a screen image of a calibration system setting screen displayed at the time of carrying out setting as to whether or not environmental correction and master correction are to be carried out.

DESCRIPTION OF THE PREFERRED EMBODIMENTS

Figure 1:
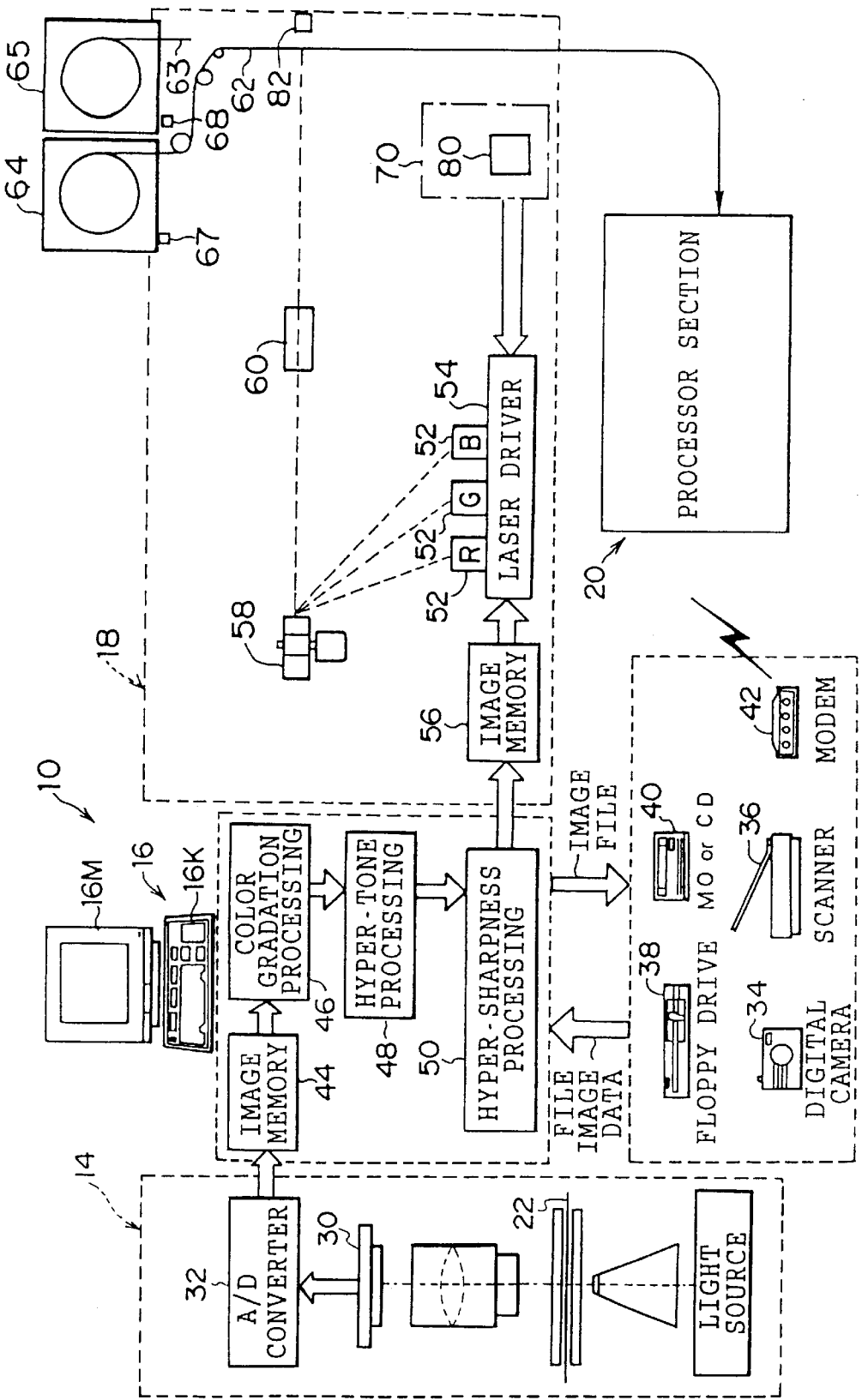
FIG. 1 is a schematic structural diagram of a digital laboratory system according to an embodiment of the present invention.
Figure 2:
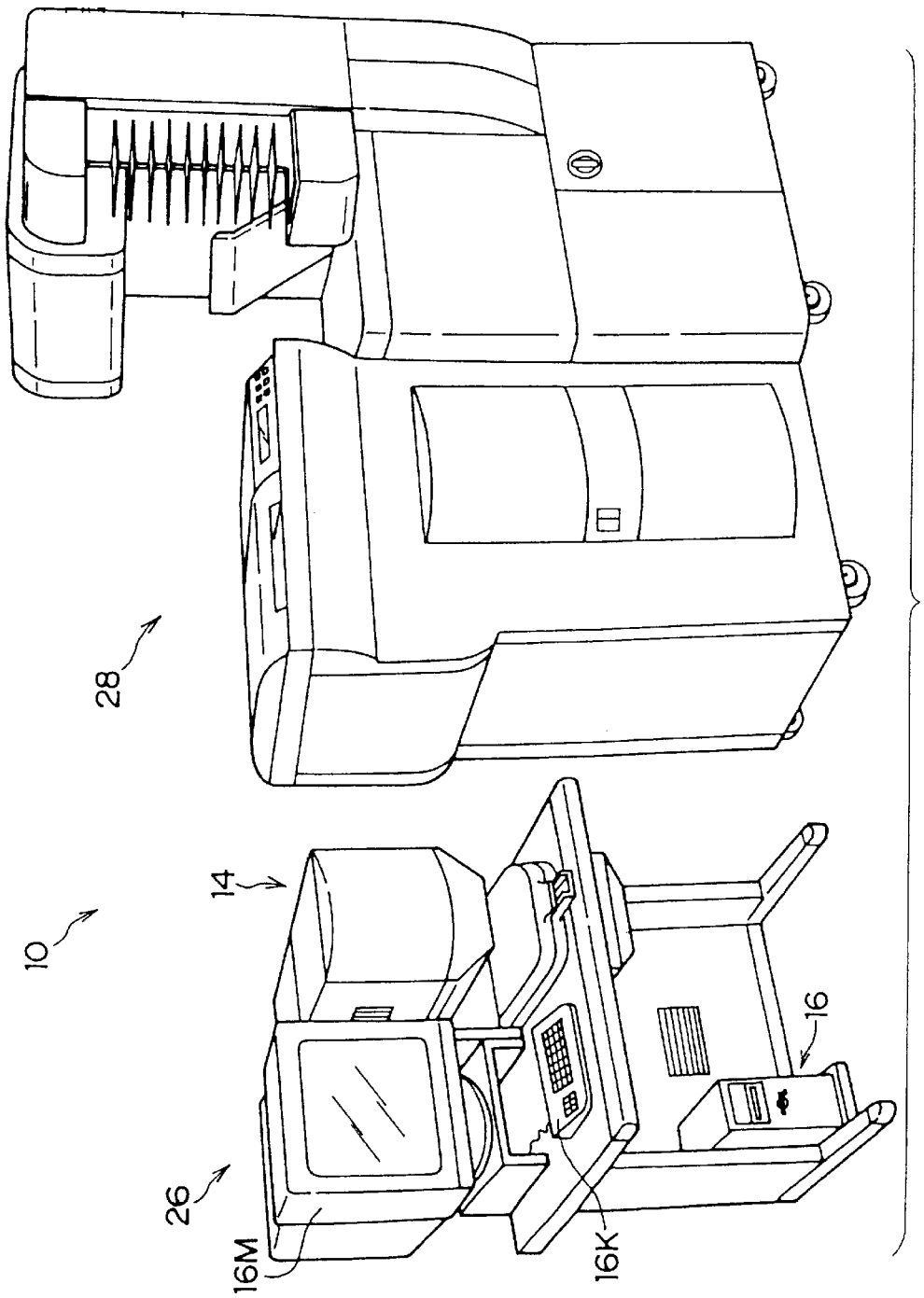
FIG. 2 is view showing the exterior of the digital laboratory system.

FIGS. 1 and 2 are schematic structural diagrams of a digital laboratory system 10 according to an embodiment of the present invention.

As shown in FIG. 1, this digital laboratory system 10 includes a line CCD scanner 14, an image processing section 16, a laser printer section 18 and a processor section 20. The line CCD scanner 14 and the image processing section 16 are integrated as an input section 26 as shown in FIG. 2. The laser printer section 18 and the processor section 20 are integrated as an output section 28 as shown in FIG. 2.

The line CCD scanner 14 reads a frame image recorded on a photograph film such as a negative film or a reversal film and is capable of reading frame images on, for example, 135 size photograph films, 110 size photograph films, photograph films on which a transparent magnetic layer is formed (240 size photograph films, which are known as APS films), and 120 size/220 size (brownie size) photograph films. The line CCD scanner 14 reads a frame image which is the object of reading by means of a line CCD 30. This image is A/D converted by an A/D converter section 32 and then output to the image processing section 16.

In the present embodiment, a case in which the digital laboratory system 10 processes a 135 size photographic film 22 will be described.

The image processing section 16 is constructed so as to be capable of inputting image data (scan image data) output from the line CCD scanner 14, image data taken by a digital camera 34 or the like, image data obtained by reading an original (e.g., a reflective original) by means of a scanner 36 (flat bed type), image data produced by another computer and recorded in a floppy disk drive 38, MO drive or CD drive 40, communication image data received through a modem 42 from outside, and the like (hereinafter, these data are referred to as file image data)

In the image processing section 16, the inputted image data is stored in an image memory 44 and then subjected to image processing such as various types of correction by a color gradation processing section 46, a hypertone processing section 48, a hypersharpness processing section 50 and the like. The processed image data is output to the laser printer section 18 as image data for recording (also called "recording image data"). The image processing section 16 is also capable of outputting the processed image data to the exterior in the form of an image file (for example, outputting the data to a recording medium such as an FD, MO, CD, or transmitting the data to another information processing apparatus through a communication line).

In the laser printer section 18 of the present embodiment, two types of photographic printing papers 62, 63 are loaded. The photographic printing papers 62, 63 are stored in corresponding magazines 64, 65 in the form of a roll. A symbol (not shown) or the like for specifying the type of the photographic printing paper is attached to the magazine 64 and an identification sensor 67 for reading this symbol or the like is provided on the magazine 64 housing portion of the laser printer section 18. Likewise, a symbol specifying the type of the photographic printing paper is attached to the magazine 65, and an identification sensor 68 for reading this symbol or the like is provided on the magazine 65 housing portion of the laser printer section 18.

The laser printer section 18 has laser light sources 52 for red, green and blue (R, G, B) and irradiates the photographic printing paper 62 (or 63) with laser light modulated in accordance with the recording image data inputted from the image processing section 16 (and temporarily stored in an image memory 56) so as to record an image on the photographic printing paper 62 (or 63) by scanning exposure (in the present embodiment, an optical system using mainly a polygon mirror 58 and an fθ lens 60 is used). The photographic printing paper 62 (or 63) on which the image is recorded is conveyed to the processor section 20 and the processor section 20 carries out color development, bleaching fixing, washing and drying processings on the photographic printing paper 62 (or 63) on which the image was recorded by scanning exposure by the laser printer section 18. As a result, the image is formed on the photographic printing paper 62 (or 63).

A temperature sensor 82 is disposed in the vicinity of a photographic printing paper to be irradiated with the laser beam. The temperature sensor 82 detects environmental information such as the temperature, which greatly affects the color development characteristic of printing. The temperature to be detected by the temperature sensor 82 may be the temperature of the photographic printing paper or the ambient temperature, and is not restricted to any particular temperature. Although not shown, it is possible to also provide a gauge other than a temperature sensor in order to detect desired environmental information, for example, a hydroscope for detecting humidity may be provided in the vicinity of the temperature sensor 82.

The laser printer section 18 has a main controller 70 for controlling the laser printer section 18. The main controller 70 controls the series of operations of the laser printer section 18 by inputting a correction value from the measurement of the density of the print of the calibration test pattern, controlling the laser driver 54 based on that correction value so as to perform calibration (actual calibration), computing the correction value for calibration from the previous calibration history, environmental information and photographic printing paper characteristic, and then controlling the laser driver 54 according to the computation results so as to effect calibration (estimated calibration)

The main controller 70 contains a calibration control section 80 for controlling calibration of the printer.

Figure 4:
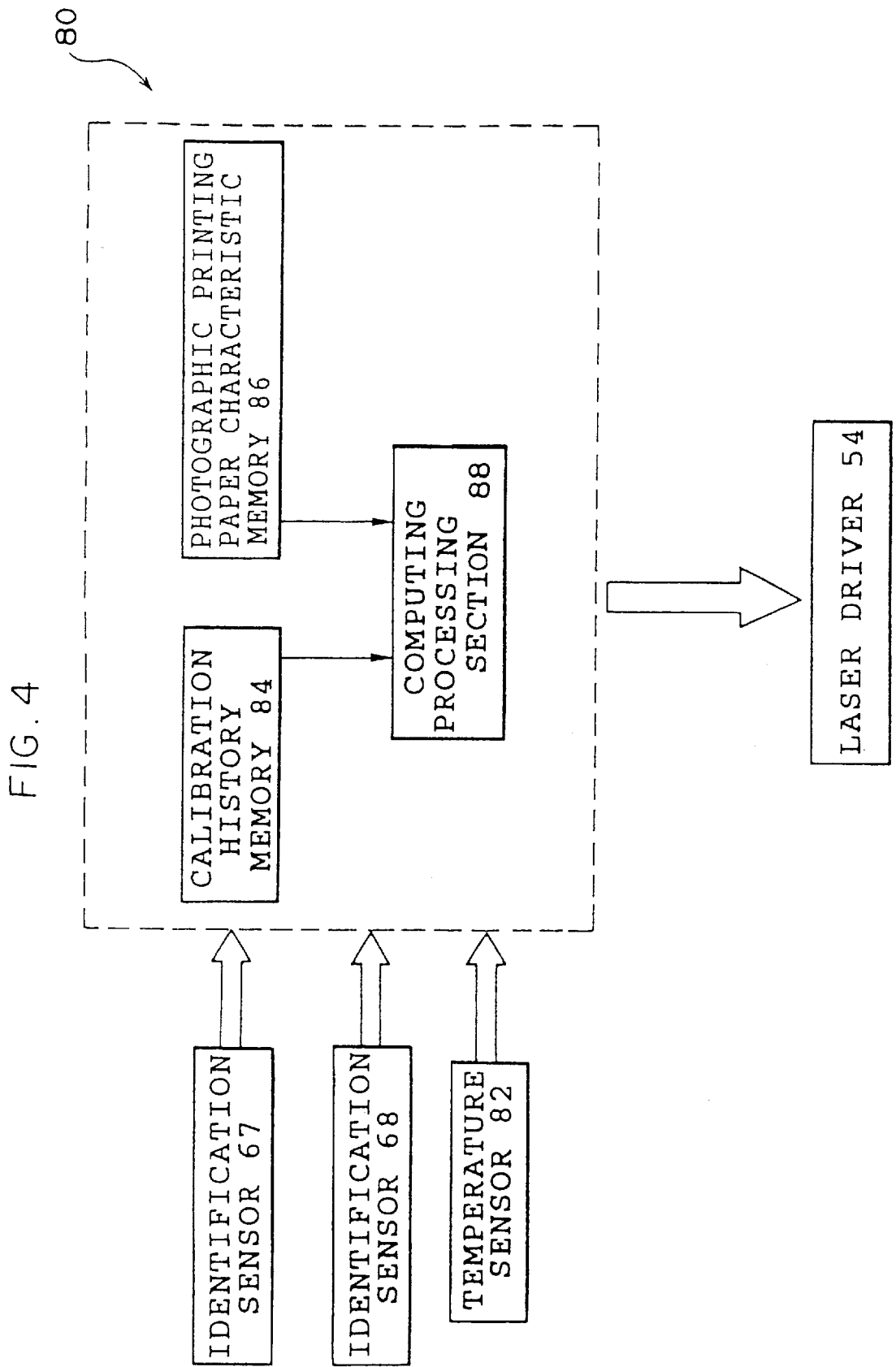
FIG. 4 is a structural diagram of a printer calibration control portion.

The calibration control section 80 which is built-in in the main controller 70 comprises a photographic printing paper characteristic memory 86, a calibration history memory 84 and a computing processing section 88 (see FIG. 4). Photographic printing paper characteristic information, such as the γ characteristic, base material, surface type, and the like, for each of various types of photographic printing papers is stored in advance in the photographic printing paper characteristic memory 86. The calibration history memory 84 stores as previous calibration history information, calibration history information which was calibrated (actually) according to results of measurement of the density of a printed calibration test pattern, environmental information such as the temperature of the previous calibration (the actual and estimated calibration) time, the photographic printing paper type, the amount of exposure after calibration, and the like. That is, the calibration history memory 84 stores, as previous calibration history information, every time the previous actual calibration and the estimated calibration are carried out, the image input/output characteristic such as the amount of exposure obtained by calibration, the environmental information such as the temperature at the time, and information including the type of the photosensitive material of the calibration target.

The calibration history information stored in the calibration history memory 84 may be calibration history information of a plurality of previous calibrations, or may be calibration history information obtained by calibrating the results of measurement of the density of the printed calibration test pattern, or may be calibration history information accompanied by adjusted in accordance with periodic changes like the four seasons.

The computing processing section 88 computes a correction value for calibration from environmental information obtained by the temperature sensor 82, the photographic printing paper type read by the identification sensor 67 or 68, the photographic printing paper characteristic information stored in the photographic printing paper characteristic memory 86, and the previous calibration history information stored in the calibration history memory 84. The results of computation are output to the laser driver 54 so as to correct the amount of exposure and the like, thereby calibrating the laser printer section 18. Alternatively, the results computed is reflected an look up table (a correction table), the image data is corrected on the basis of the look up table, and exposure is carried out on the basis of the value of the corrected image data so as to carry out calibration of the laser printer section 18.

Whether or not the correction of the amount of exposure should be carried out (i.e., whether or not correction based on a correction value calculated by using the previous calibration history information stored in the calibration history memory 84 should be carried out) can be set arbitrarily by a user through a display 16M provided at the image processing section 16 of the input section 26.

The main controller 70 monitors to see whether or not a correction value determined by the computing processing section 88 is a predetermined value or less. If the determined correction value exceeds the predetermined value, the amount of change in the image input/output characteristic is too large, and it is determined that the reliability of correction by using this correction value is low. The user is then urged through the display 16M to carry out calibration (calibration by printing a calibration test pattern) again.

The main controller 70 monitors the amount of time which has passed since the calibration history information was stored into the calibration history memory 84. If the period of time which has elapsed since the calibration history information was stored is a predetermined time or longer, the main controller 70 recognizes that that calibration history information is old and the reliability of the correction based on a correction value obtained by using this calibration history information is low, and then urges the user through the display 16M to calibrate again (calibration by printing a calibration test pattern).

Hereinafter, operation of the present embodiment will be described.

The calibration of the laser printer will be described with reference to the time chart shown in FIG. 3.

In the current calibration 4 of the photographic printing paper 63 accommodated in the magazine 65, a symbol or the like attached to the magazine 65 is read so as to identify the photographic printing paper type. Based on the identified photographic printing paper type, a correction value for the present calibration 4 is computed from the photographic printing paper characteristic information stored in the photographic printing paper characteristic memory 86; the calibration history information of the photographic printing paper 63 in the magazine 65, which calibration history information is stored in the calibration history memory 84 (e.g., calibration history information for calibration 3); and environmental information obtained by the temperature sensor 82. The computed correction value is used to correct the amount of exposure. (Hereinafter, this correction is referred to as "environmental correction".)

By this environmental calibration, it is possible to compensate for changes in the image input/output characteristic since the last calibration (calibration by printing the calibration test pattern), which changes are based on environmental changes such as changes in temperature, without printing any calibration test pattern.

In the calibration 4 of the photographic printing paper 63 accommodated in the magazine 65, the calibration history information of the photographic printing paper 62 accommodated in the magazine 64, which calibration history information is stored in the calibration history memory 84 (for example, calibrations 1, 2), are regarded as reference information. (The magazine 64 at this time is called "master magazine".) An amount of change in characteristic between the reference information of these calibrations 1, 2 is computed. Then, a correction value for the calibration 4 is computed so as to correct the amount of exposure. The correction value for the calibration 4 is calculated from: the amount of change in characteristic between the reference information of calibrations 1,2; the calibration 3 history information of the photographic printing paper 63 accommodated in the magazine 65, which information is stored in the calibration history memory 84; the photographic printing paper characteristic information stored in the photographic printing paper characteristic memory 86; and the environmental information obtained from the temperature sensor 82. (Hereinafter, this correction is referred to as "master correction".)

By this master correction, changes in the image input/output characteristic common to both magazines due to deterioration of the development solution or the like, as well as changes in the image input/output characteristic since the last calibration due to environmental change such as changes in, temperature can be corrected without printing a calibration test pattern.

Whether or not environmental correction and master correction should be carried out is determined arbitrarily by the user. This setting is carried out through a calibration system setting screen 90 displayed on the display 16M. FIG. 7 shows this calibration system setting screen 90.

As shown in FIG. 7, the calibration system setting screen 90 enables the user to select whether or not the environmental system will be used. If YES is selected in regard to use of the environmental system, calibration using the environmental correction will be carried out.

Further, the calibration system setting screen 90 enables the user to select whether or not the master magazine will be registered. If YES is selected in regard to registration of the master magazine, calibration using the master correction will be carried out. Further, a master magazine can be specified by setting a master magazine ID.

Next, specific contents of the processing to be carried out at the calibration control section will be described.

The calibration control of the laser printer will be described with reference to FIG. 4.

If setting is carried out on the calibration system setting screen 90 such that environmental correction will be carried out, the calibration control section carries out control such that the symbols or the like attached to the magazines 64, 65 are read by means of the identification sensors 67, 68 provided at the magazines 64, 65 so as to identify the type of a photographic printing paper accommodated in each magazine. An exposure amount correction value for calibration is computed by the computing processing section 88 from the identification information of the identified photographic printing paper type; the photographic printing paper characteristic information stored in advance in the photographic printing paper characteristic memory 86, such as the γ characteristics, base materials, surface types, and the like, or various types of photographic printing papers; the environmental information such as the temperature obtained by the temperature sensor 82; and history information of previous calibrations stored in the calibration history memory 84. The results of computation are output to the laser driver 54 so as to carry out calibration.

For example, in case in which a change in the amount of exposure due to temperature is to be corrected by using temperature as the environmental information, the relation between the target exposure amount E0 for outputting a target density and an actually obtained exposure amount E' is obtained in the form of formula (1) from the results of calibration carried out the last time.

$$E' = \alpha \times E0 + \beta \quad (1)$$

wherein

α: coefficient differing in accordance with the type of photographic printing paper, β: input/output characteristic, E0: target amount of exposure for outputting a target density, E': actually obtained amount of exposure.

Figure 5:
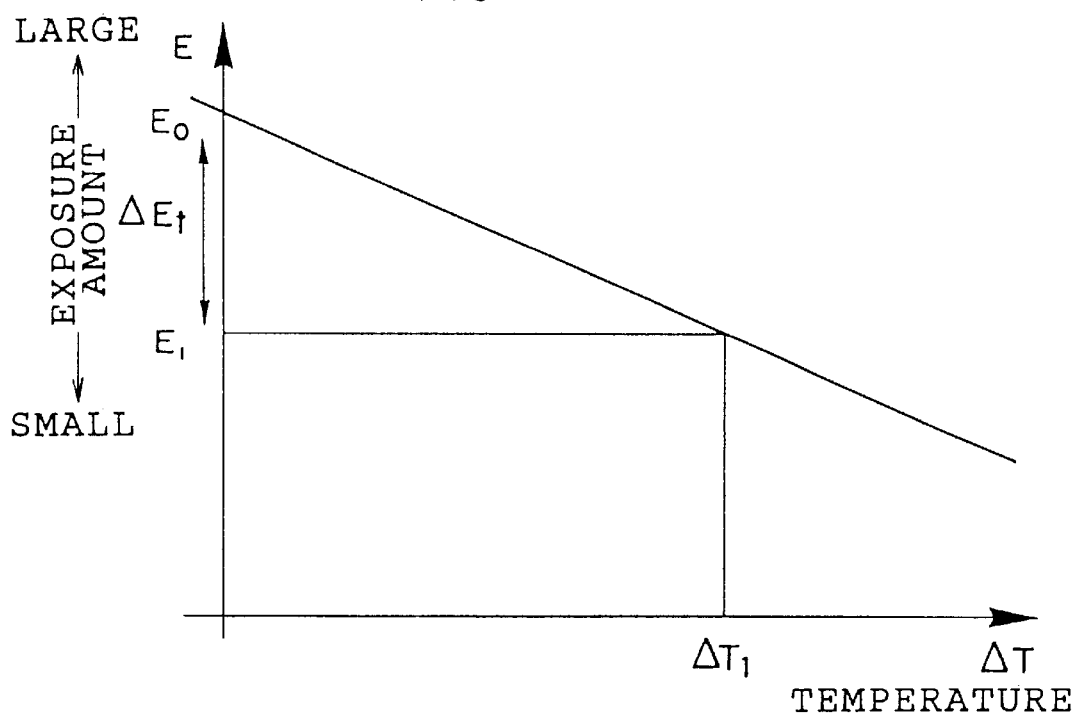
FIG. 5 shows a relation between the temperature difference from the last calibration time and a target exposure amount E, which is a characteristic obtained from characteristic information for each type of photographic printing paper.

With regard to the relation between the difference in temperature from the last calibration and the target exposure amount E, the target exposure amount E1 for outputting a target density can be expressed by following formula (2), if it is assumed, from a characteristic obtained from the characteristic information for the respective photographic printing paper types (a proportional characteristic such as that shown in FIG. 5), that the temperature difference between the current time and the last calibration time is $\Delta T1$.

$$E1 = E0 - k \times \Delta Et \quad (2)$$

wherein k: coefficient in a case where the slope of a direct proportional line (the line in FIG. 5) of the photographic printing paper characteristic is different from each density region of a target density, E0: target exposure amount at the last calibration time, E1: target exposure amount for outputting a target density, $\Delta Et$: target exposure amount differing in accordance with a temperature change ($\Delta Et$ may be positive or negative).

Accordingly, the amount of exposure E' for obtaining the current target density can be obtained from formula (3).

$$E' = \alpha \times E1 + \beta = \alpha \times (E0 \cdot k \times \Delta_{Et}) + \beta \quad (3)$$
$$= \alpha \times E0 + (\beta \cdot \alpha \times k \times \Delta_{Et})$$

wherein

α: coefficient differing in accordance with the type of photographic printing paper, β: correction value of exposure amount for calibration, E': exposure amount for obtaining a target density, E0: target amount of exposure at last calibration time, E1: target amount of exposure for outputting a target density.

Further, $$\beta' = \beta - \alpha \times k \times \Delta Et \quad (4)$$

wherein

β': correction value of amount of exposure for current calibration.

That is, formula (4) for β' can be obtained so that an exposure amount correction value for the current calibration can be obtained.

Figure 3:
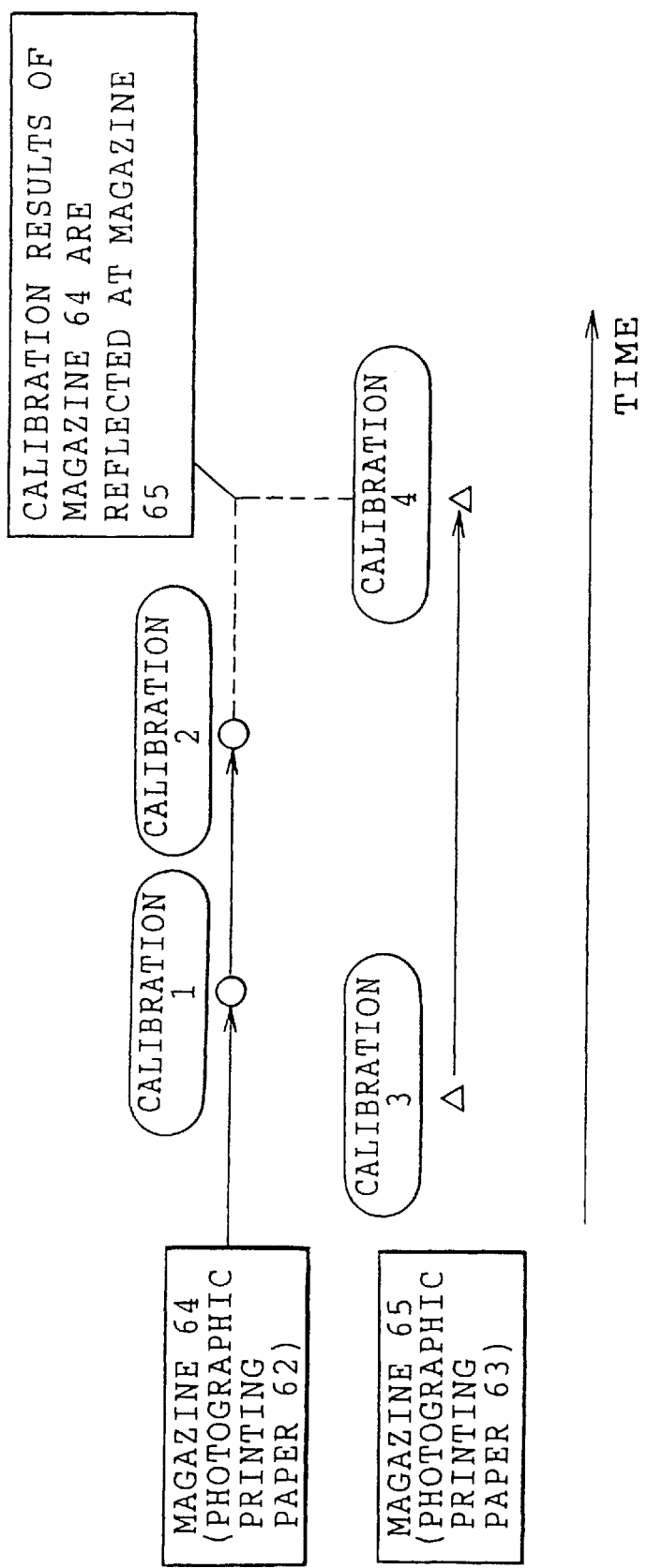
FIG. 3 is a time chart for printer calibration.

Referring to the time chart of FIG. 3, in the current calibration 4 for the photographic printing paper 63 accommodated in the magazine 65, the correction value of the amount of exposure for the current calibration 4 is computed from the calibration 3 which is the last calibration history information, and from the photographic printing paper characteristic information and from the environmental information, so that the calibration can be carried out without printing a calibration test pattern. As a result, the work of printing the calibration test pattern and measuring the density or the like can be eliminated, thereby improving the working efficiency and saving photographic printing paper.

Next, calibration control in a case where setting is carried out by using the calibration system setting screen 90 such that master calibration will be carried out will be described. Hereinafter, a case where the magazine 64 is registered as the master magazine will be described.

In the calibration and the calibration before the last one, for the photographic printing paper 62 accommodated in the magazine 64, calibration test patterns were printed, the densities thereof were measured, and calibration was carried out on the basis of the results of measurement. These previous calibration history information from the last calibration and calibration before the last one are stored as the previous calibration history of the photographic printing paper 62 of the magazine 64. If these stored calibration history information is regarded as reference information (it is possible to store a plurality of previous calibration histories and select any of them as the reference information, or to store calibration history information caused by periodic changes such as the four seasons and select any of them as the reference information), the total amount of change ΔEa of the exposure amount between the last calibration and the calibration before the last one is considered to contain an amount of change k×ΔEt in the exposure amount due to the temperature and an amount of change ΔEm of the exposure amount common to both magazines 64 and 65. This is expressed by formula (5).

$$\Delta Ea = k \times \Delta Et + h \times \Delta Em \quad (5)$$

wherein h: coefficient obtained by experiment,

ΔEa: total amount of change in the exposure amount between the last calibration and the calibration before the last one of the magazine 64, k×ΔEt: amount of change in the exposure amount due to temperature, ΔEm: amount of change in the exposure amount common to magazines 64 and 65.

Following formula (6) is obtained from formula (5).

$$h \times \Delta Em = \Delta Ea - k \times \Delta Et \quad (6)$$

Figure 6:
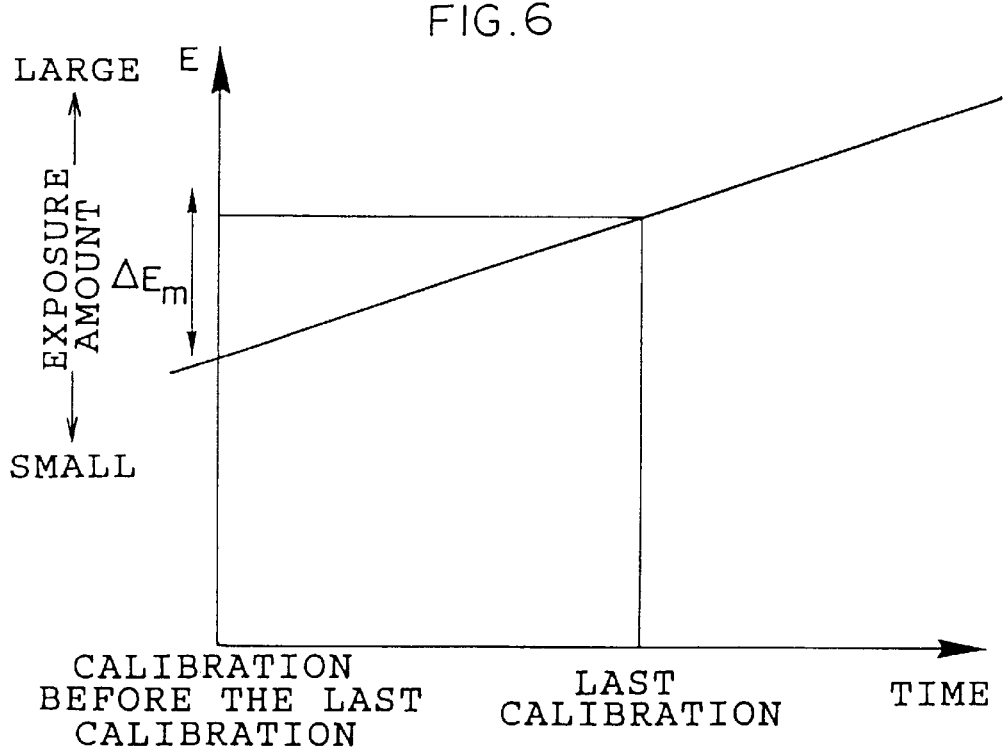
FIG. 6 shows a relation between a time change and a calibration exposure amount in printer calibration.

Here, if the ΔEm is the amount of change in the exposure amount due to, for example, deterioration of the development solution, a direct proportional relation as shown in FIG. 6 exists between the amount of exposure and time. (Although this relation may be, more precisely, a quadratic curve, a third-order curve, or a diffusion characteristic or the like due to the surrounding environment, there is no problem with expressing the overall characteristic as direct proportional.) The ΔEm is an amount of change common to the magazines 64 and 65 and can be applied to the other magazine 65. Assuming that the temperature change between the last calibration and the calibration before the last one is k×ΔEt', the amount of exposure E' for obtaining a target amount of exposure can be obtained according to following formula (7).

$$E' = \alpha \times (E0 - k \times \Delta_{Et'} + h \times \Delta_{Em}) + \beta \quad (7)$$
$$= \alpha \times E0 + (\beta \cdot \alpha \times k \times \Delta_{Et'} + \alpha \times h \times \Delta_{Em})$$

$$\beta' = \beta - \alpha \times k \times \Delta_{Et'} + \alpha \times h \times \Delta_{Em} \quad (8)$$

wherein

α: coefficient differing in accordance with the type of photographic printing paper, β: correction value of exposure amount for calibration, E': exposure amount for obtaining a target density, E0: target exposure amount at the last calibration time, E1: target exposure amount for outputting a target density, h: coefficient obtained by experiment, ΔEa: total amount of change in exposure amount between the last calibration and the calibration before the last one of the magazine 64, k×ΔEt': amount of change in exposure amount due to temperature, ΔEm: amount of change in exposure amount common to the magazines 64 and 65, β': correction value of exposure amount for current calibration.

The formula (8) for β' is obtained from the formula (7) so that the exposure amount correction value for the current calibration can be obtained.

That is, with reference to the time chart shown in FIG. 3, in the current calibration 4 for the photographic printing paper 63 accommodated in the magazine 65, the previous calibration information of the photographic printing paper 62 accommodated in the magazine 64, for example, calibrations 1, 2, are regarded as reference information. An amount of change in the characteristic of the amount of exposure between the reference information of the calibrations 1 and 2 is computed. Then, the exposure amount correction value for the current calibration 4 is computed from the amount of change in the exposure amount; the calibration history information of the calibration 3 which is the previous calibration information on the photographic printing paper 63 accommodated in the magazine 65; the photographic printing paper characteristic information; and the environmental information. As a result, calibration can be carried out without printing a calibration test pattern. Consequently, the work of by printing the calibration test pattern and measuring the density can be eliminated, thereby improving the working efficiency and saving photographic printing papers.

When more accurate environmental correction and the a master correction are carried out, as previous calibration (the last calibration and the calibration before the last) history information, the history information of the calibration which is carried out by printing the test pattern is used, and the correction value is computed. When the history information of the calibration which is carried out by printing the last test pattern is used, furthermore accurate environmental correction and the master correction can be carried out.

If the correction value of the exposure amount in the environmental correction and the master correction (see formulae (4), (8)) is large, i.e., if the amount of change in the exposure amount of the image input/output characteristic since the time of the previous calibration (the time of calibration carried out by printing the calibration test pattern) is large, there is the possibility that the environmental correction and the master correction may not be able to compensate for this change in the exposure amount, and thus, it may be not possible to obtain a recorded image of a desired gradation.

If a long time has passed since the reference information was stored, i.e., if a long time has passed since the last calibration was carried out (calibration was carried out by printing a calibration test pattern), there is the possibility that the reference information may not accurately reflect the current state of the digital laboratory system 10 (the sensitivity of the development solution or the like), and thus, it may be not possible to obtain a recorded image of a desired gradation.

Figure 8A:
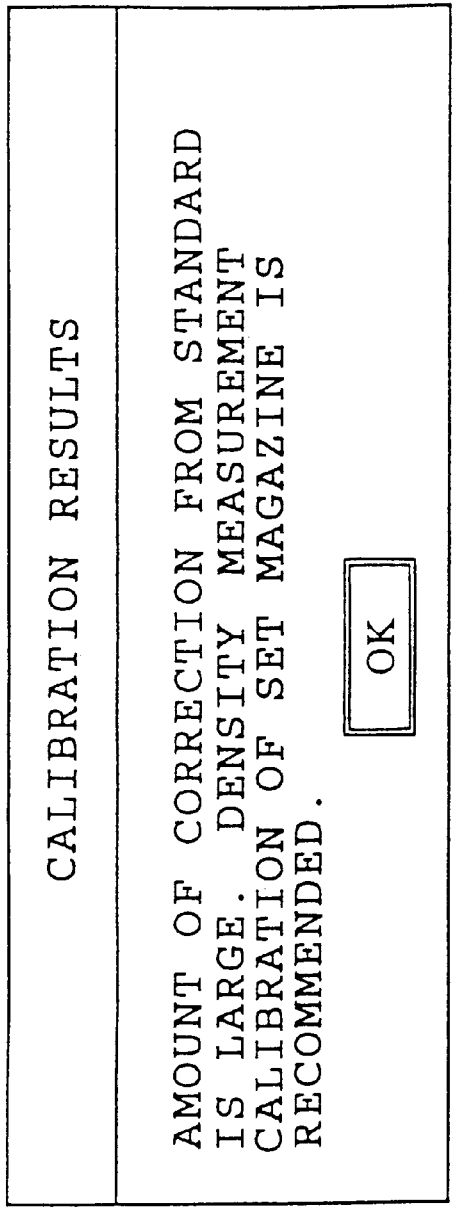
FIG. 8A shows a screen image of a calibration result screen displayed when a correction amount exceeds a predetermined value in a case where the reliability of the environment correction and master correction is low.

Therefore, the main controller 70 displays a message shown in FIG. 8A on the display 16M if the correction amount of the exposure amount in the environmental correction or master correction exceeds a predetermined value. This notifies the user that the correction amount of the exposure amount is large and urges the user to carry out calibration by printing a calibration test pattern.

Figure 8B:
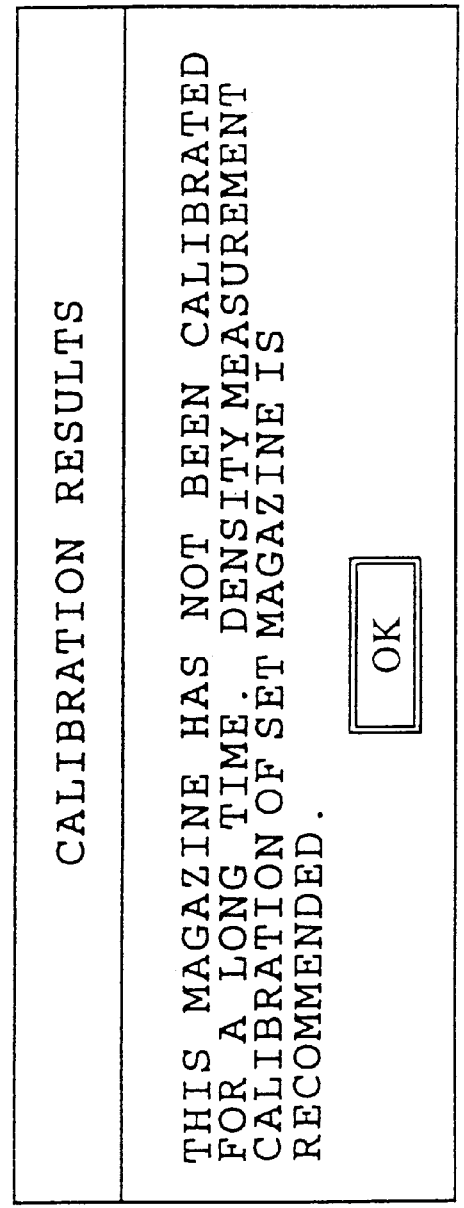
FIG. 8B shows a screen image of the calibration result screen displayed when calibration has not been carried out for a long time in a case where the reliability of the environment correction and master correction is low.

If a predetermined period of time or larger has passed since the reference information was stored, the message shown in FIG. 8B is displayed on the display 16M. That is, the user is notified that calibration has not been carried out for a long time and is urged to carry out calibration by printing a calibration test pattern.

As described above, by displaying the messages of FIGS. 8A, 8B on the display 16M so as to notify the user that the reliability of the environmental correction and the master correction is low, it is possible to prevent environmental correction and master correction having low reliability from being carried out.

If the computed amount of change in the exposure amount of an image input/output characteristic is large, in order to obtain a more appropriate print, the laser printer section 18 can be calibrated by selecting whether or not the stored reference information is to be used, or by multiplying the computed exposure amount correction value by a coefficient and using the product as the actual exposure amount correction value, or by replacing the computed exposure amount correction value with a correction amount of an exposure value which can be corrected, or the like.

If a long time has passed since the reference information has been stored, the laser printer section 18 can be calibrated by selecting whether the stored reference information is to be used or not.

In above-described embodiment, carrying out time of the environmental correction and the master correction which are estimated calibration of the present invention is not limited. Estimated calibration may be carried out at a predetermined carrying out time, for example, at a time the magazine is set, every time an image is recorded, every time a predetermined image is recorded, every time a predetermined time has passed, and at the opening hour. Therefore, stable output (high quality image) can be obtained from the laser printer section 18.

Figure 9:
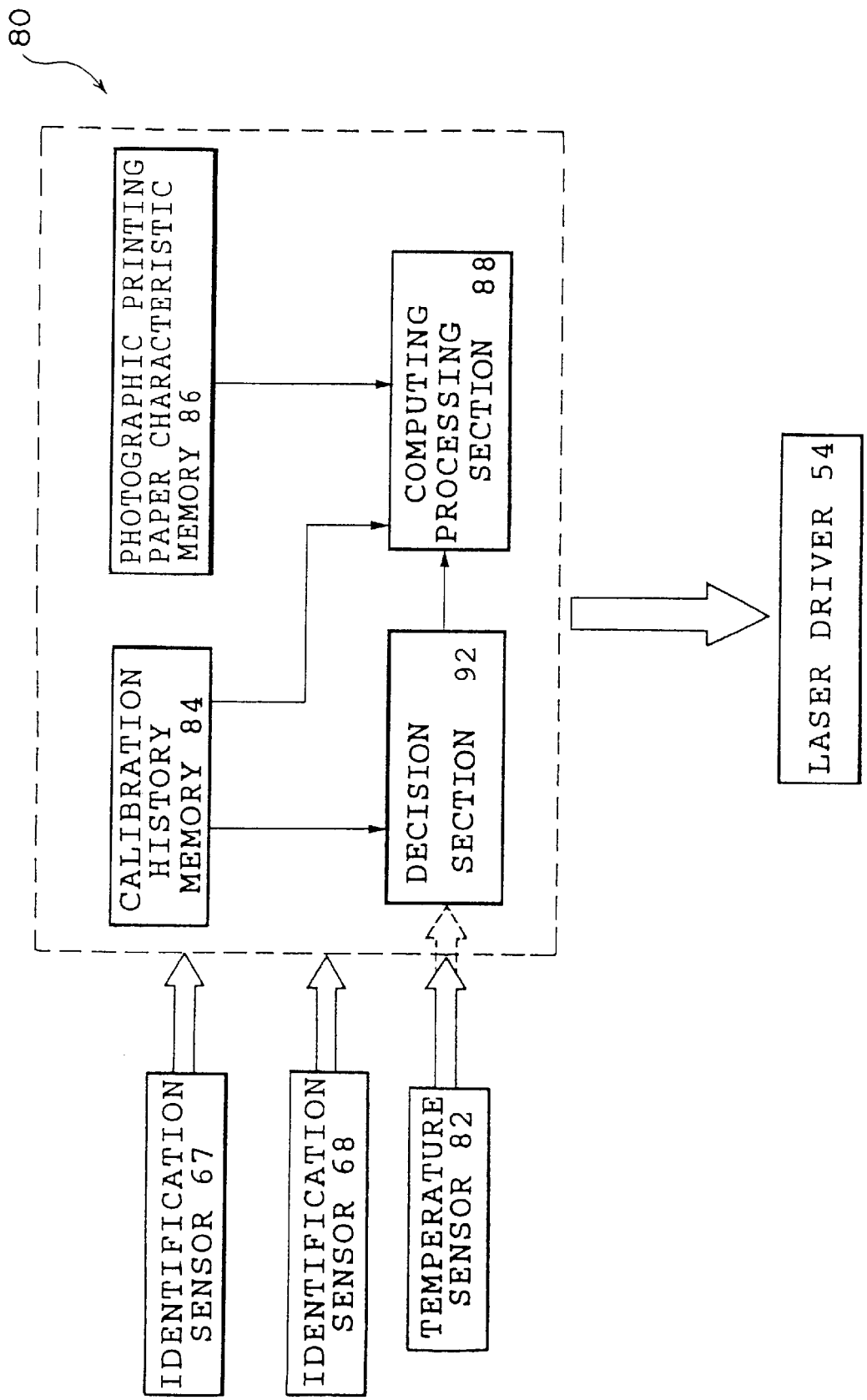
FIG. 9 is a structural diagram of an example of a printer calibration control section according to another embodiment of the present invention.

When estimated calibration is carried out in accordance with small change in temperature, output from the laser printer section 18 (the output density) changes in a small scale. Therefore, the decision may be made whether estimated calibration (the environmental correction and the master correction) is carried out based on the change of environmental information such as the temperature. In FIG. 9, an example of a printer calibration control section 80 in this case is shown.

As shown in FIG. 9, a decision section 90 which decides whether the environmental correction and the master correction is carried out is provided at the printer calibration control section 80. The decision section 90 is connected to a temperature sensor 82, a calibration history memory 84 and a computing processing section 88.

Among calibration history information stored in the calibration history memory 84, the temperature information including the last calibration history information is compared with the current temperature measured by the temperature sensor 82. When the difference between these temperatures is a predetermined value (hereinafter, represented by "decision threshold value", 2° C. as an example in the present invention) or more, the decision section 90 controls the computing processing section 88 so as to compute. The decision threshold value may be set by an unillustrated setting means or may be stored in a memory in advance.

That is, by the decision section 90, when the temperature changes 2° C. or more from the time of the last calibration carried out, the environmental correction and the master correction is carried out. When the temperature changes within 2° C. from the time of the last calibration carried out, the environmental correction and the master correction is not carried out.

Therefore, the small changes of output from the laser printer section 18 (output density) which is caused by carrying out estimated calibration in small change in temperature is prevented, and stable output (high quality image) can be obtained.

Generally, it is known that the change in the characteristic of photographic printing paper caused by the environmental variation is different from each type of the photographic printing paper. The decision threshold value is set (or stored) for every photographic printing paper and a different decision threshold value is used in accordance with the type of the photographic printing paper. Therefore, if the type of the photosensitive material is changed, the decision is always appropriate.

In above-described embodiment, the present invention is applied to the digital laboratory system. Of course, the present invention may be applied to analog laboratory system.

In accordance with the present invention, the printer is calibrated by computing an amount of change in an image input/output characteristic from previous calibration history information, photographic printing paper characteristic information, and environmental information, without having to print a calibration test pattern and measure the density. Thus, the present invention achieves the excellent effects of improving work efficiency and saving photosensitive materials.

What is claimed is:

1. An image recording apparatus for recording an image on a photosensitive material wherein a calibration test pattern is outputted based on calibration test pattern data, the output calibration test pattern is read, an image input/output characteristic is computed based on the read pattern data, and calibration is carried out, said image recording apparatus comprising: photosensitive material characteristic storage means for storing a characteristic of the photosensitive material on which the image is to be recorded;

environmental information obtaining means for obtaining environmental information which affects changes in the characteristic of the photosensitive material on which the image is to be recorded;

photosensitive material characteristic reading means for reading the characteristic of the photosensitive material on which the image is to be recorded from said photosensitive material characteristic storage means; and estimated calibration means for computing an image input/output characteristic for calibration from the characteristic read by said photosensitive material characteristic reading means, previous calibration information including the image input/output characteristic computed at a previous calibration time, and the environmental information at a current calibration time.

2. An image recording apparatus according to claim 1 wherein said estimated calibration means carries out calibration using actual calibration information based on the read pattern data as previous calibration information.

3. An image recording apparatus according to claim 2 wherein an actual calibration information based on the read pattern data is an actual calibration information based on the last read pattern data.

4. An image recording apparatus according to claim 1 further comprising an identification means for identifying the type of the photosensitive material, wherein the characteristic of said photosensitive material is read from said photosensitive material characteristic storage means on the basis of the type of the photosensitive material identified by said identification means.

5. An image recording apparatus according to claim 1 further comprising a calibration history storing means for storing actual calibration information which is based on the read pattern data, and calibration information by said estimated calibration means.

6. An image recording apparatus according to claim 5 wherein said calibration history storing means stores at least two pieces of the calibration information as reference information, and said estimated calibration means carries out calibration based on an amount of change obtained from the stored reference information.

7. An image recording apparatus according to claim 6 wherein the reference information stored in said calibration history storing means is subjected to calibration based on said read pattern data.

8. An image recording apparatus according to claim 7 wherein said estimated calibration means carries out calibration based on an amount of change obtained from the reference information in consideration of an amount of change in characteristic of the photosensitive material due to environmental variation.

9. An image recording apparatus according to claim 6 wherein at the time of calibration by said estimated calibration means, if a correction value is a predetermined value or more, calibration is carried out without using the reference information or by restricting the correction value.

10. An image recording apparatus according to claim 6 wherein when a predetermined period of time has passed since the reference information was obtained, at the time of calibration by said estimated calibration means, the calibration computation is carried out without using the reference information.

11. An image recording apparatus according to claim 6 wherein a plurality of the previous calibration history information including a calibration caused by a periodic change are stored as the reference information, and the calibration is carried out by said estimated calibration means by selecting any of the stored plurality of the reference information.

12. An image recording apparatus according to claim 6 further comprising a first notification means for giving notice that a correction value is a predetermined value or more at a time of calibration by said estimated calibration means.

13. An image recording apparatus according to claim 12 wherein said first notification means urges that actual calibration be carried out based on said read pattern data.

14. An image recording apparatus according to claim 6 further comprising a second notification means for giving notice that a predetermined time or more has passed since the reference information was obtained.

15. An image recording apparatus according to claim 14 wherein said second notification means urges that actual calibration be carried out based on said pattern data.

16. An image recording apparatus according to claim 5 further comprising:

comparison means for comparing environmental information included a last calibration information stored in said calibration history storing means when a last calibration is carried out and environmental information when the current calibration is carried out;

decision means for deciding whether calibration is carried out by said estimated calibration means based on results of said comparison means.

17. An image recording apparatus according to claim 16 wherein said decision means decides using a decision threshold value different from each type of the photosensitive material.

18. An image recording apparatus according to claim 17 wherein said estimated calibration means carries out calibration at a predetermined carrying out time.

19. An image recording apparatus according to claim 1 wherein the environmental information is at least information including temperature.

* * * * *